United States Patent [19]
Filipuzzi et al.

[11] Patent Number: 5,604,776
[45] Date of Patent: *Feb. 18, 1997

[54] METHOD FOR MAKING A SEALED PASSAGE IN A REFRACTORY COMPOSITE PART WITH A PLASTICALLY DEFORMABLE METAL LINING WHICH SEALS PASSAGE WALLS, AND APPLICATION OF THE PRODUCTION OF A REFRACTORY COMPOSITE STRUCTURE COOLED BY FLUID CIRCULATION

[75] Inventors: Ludovic Filipuzzi, Pessac; Philippe Huet, Margaux, both of France

[73] Assignee: Societe Europeenne de Propulsion, Suresnes, France

[ * ] Notice: The term of this patent shall not extend beyond the expiration date of Pat. No. 5,583,895.

[21] Appl. No.: 471,648

[22] Filed: Jun. 6, 1995

Related U.S. Application Data

[62] Division of Ser. No. 256,253, filed as PCT/FR92/01243 Dec. 30, 1992.

[30] Foreign Application Priority Data

Dec. 31, 1991 [FR] France .................... 91 16390

[51] Int. Cl.[6] ......................................... G21C 11/08
[52] U.S. Cl. ............................ 376/150; 165/168
[58] Field of Search ................... 376/150, 134, 376/136, 900, 904; 165/168, 169, 171, 134.1, 904; 428/408, 614, 615; 228/183, 262.8

[56] References Cited

U.S. PATENT DOCUMENTS

| | | | |
|---|---|---|---|
| 4,852,645 | 8/1989 | Coulon et al. | 165/180 |
| 5,012,860 | 5/1991 | Mukherjee | 376/150 |
| 5,023,043 | 6/1991 | Kotzlowski et al. | 376/150 |
| 5,174,368 | 12/1992 | Boury et al. | 165/168 |
| 5,182,075 | 1/1993 | Gotoh et al. | 376/150 |
| 5,390,217 | 2/1995 | Ioki et al. | 376/150 |

*Primary Examiner*—Daniel D. Wasil
*Attorney, Agent, or Firm*—Weingarten, Schurgin, Gagnebin & Hayes LLP

[57] ABSTRACT

A sealed passage is formed in a part of refractory composite material by inserting a tubular metal lining in a hole in the part, brazing material being interposed between the lining and the hole, and by heating to braze the metal lining to the wall of the hole, so that the metal lining defines a sealed passage (38). The metal lining (39) is plastically deformable under the conditions of use of the part such that differential expansion of thermal origin between the refractory composite material and the metal lining can be compensated by plastic deformation of the lining. The method is particularly applicable to providing thermal protection that is cooled by the flow of a cooling fluid, and that is suitable for a deflector in an electromgnetic confinement chamber for a plasma in an installation for controlled thermonuclear fusion, said protection being constituted by a plurality of elements (30) made of refractory composite material and having sealed intel passages (38) connected to pipework (40, 42) for feeding and removing a cooling fluid.

12 Claims, 3 Drawing Sheets

METHOD FOR MAKING A SEALED PASSAGE IN A REFRACTORY COMPOSITE PART WITH A PLASTICALLY DEFORMABLE METAL LINING WHICH SEALS PASSAGE WALLS, AND APPLICATION OF THE PRODUCTION OF A REFRACTORY COMPOSITE STRUCTURE COOLED BY FLUID CIRCULATION

This application is a division of application Ser. No. 08/256,253, filed as PCT/FR92/01243 Dec. 30, 1992.

The present invention relates to forming a sealed passage in a part of refractory composite material.

A particular, but non-exclusive, field of application of the invention is making structures of refractory composite material that are cooled by a flow of fluid.

Refractory composite materials are materials that comprise fiber reinforcement constituted by fibers of refractory material, densified by a matrix that is also of refractory material. The refractory material constituting the fibers may be carbon or a ceramic (e.g. silicon carbide). The same applies to the material constituting the matrix.

Densification of the fiber reinforcement by the matrix consists in filling the voids initially present around the reinforcement with the material that constitutes the matrix. Such densification may be implemented by impregnating the fiber reinforcement with a precursor of the matrix and by subsequently transforming the precursor. Thus, a carbon matrix may be obtained by impregnating the fiber reinforcement with a resin having a high coke content, by causing the resin to cross-link, and by pyrolysis. Another common densification technique consists in performing chemical vapor deposition or infiltration. To this end, the fiber reinforcement is placed in an enclosure into which a gas is admitted, the gas being such that under determined conditions of temperature and pressure it causes matrix-constituting material to be deposited on the fibers of the reinforcement, said deposition being produced by the gas decomposing or by a chemical reaction between the components of the gas on contact with the fibers and throughout the volume of the reinforcement. Thus, a carbon matrix may be obtained by decomposing one or more gaseous hydrocarbons.

Whatever the technique used for densifying the fiber reinforcement, the voids initially contained therein are never completely filled. The composite material retains residual porosity.

Refractory composite materials are remarkable for their thermostructural properties, i.e. their excellent resistance to mechanical forces, thus enabling them to constitute structural elements, in combination with their ability to retain this mechanical strength up to temperatures that are relatively high.

Nevertheless, in applications at very high temperatures (e.g. above 1700° C.) and over periods of time that are relatively long, it is necessary to consider active cooling of parts made of refractory composite material.

Thus, to achieve thermal protection of a deflector of a toroidal enclosure used for electromagnetic confinement of a plasma, proposals have been made to fix bricks of carbon/carbon (C/C) composite material (having carbon fiber reinforcement and a carbon matrix) on metal tubes conveying a flow of cooling fluid. The bricks of C/C composite material provide thermal protection while the metal tubes serve both to provide the cooling fluid circuit and to provide the structure that imparts mechanical strength to the assembly. The use of different materials, namely a refractory composite material together with a metal, raises difficulties associated with the differences in thermal expansion of said materials.

In the same application, U.S. Pat. No. 5,023,043 (corresponding to EP 0 181 385) describes a thermal protection structure made up of graphite elements having housings in which metal tubes are brazed to enable a cooling fluid to flow. The metal tubes provide the mechanical strength of the structure, since graphite cannot perform that function. The tubes are made of a material, such as molybdenum, that has a coefficient of thermal expansion that is close to that of graphite, and they are dimensioned so as to avoid being subjected to deformation in use.

In the prior art thermal protection systems mentioned above, the thermal protection function is provided by the C/C composite material or by the graphite, while the structural function is provided by the metal tubes of the cooling circuit.

The properties of refractory composite materials make it possible to consider implementing a thermal protection structure in which said materials serve both to perform the structural function and the thermal protection function, with cooling being achieved by a flow of fluid along channels formed in the composite material. A sealing problem then clearly arises because of the residual porosity of the composite material.

Thus, an object of the present invention is to provide a method enabling a sealed passage to be made in a part of refractory composite material.

Another object of the present invention is to provide a thermal protection structure of refractory composite material capable of being cooled by a cooling fluid flowing along at least one passage formed in the structure.

According to the invention, the formation of a sealed passage in a part made of refractory composite material comprises the following steps:

inserting a tubular metal lining with interposed brazing in a hole in the part; and heating to braze the metal lining to the wall of the hole, thereby defining a sealed passage, the metal lining being plastically deformable under the conditions of use of the part such that differential expansion of thermal origin between the refractory composite material and the metal lining can be compensated by plastic deformation of the lining.

This method makes it possible in a manner that is very simple and cheap to implement a structure of refractory composite material that is cooled by a flow of cooling fluid within the structure.

Compared with the solutions of the prior art, the metal is used solely as a sealing barrier lining the passages in which the cooling fluid flows. Thus, whereas in the system of U.S. Pat. No. 5,023,043 it is the metal tubes that provide the structural function and that must therefore be incapable of deforming in use, in the present invention it is the refractory composite material that performs the structural function in addition to the thermal protection function, and since the metal linings serve no structural function they can be allowed to deform plastically so as to compensate for differential expansion.

Furthermore, the invention makes it possible to achieve a considerable weight saving, since the density of composite material is much less than that of metal. Also, deformation of thermal origin is less with a load bearing structure made of a refractory composite material than it is with a load bearing structure made of metal. By way of example, the coefficient of thermal expansion of a C/C composite material is about ten times smaller than that of copper.

A particular embodiment of the invention is described below by way of non-limiting example. Reference is made to the accompanying drawings, in which.

Figure 1:
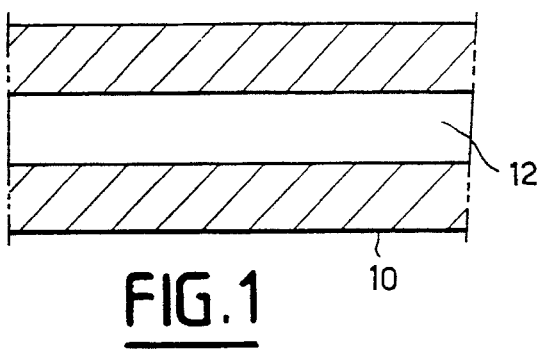
FIGS. 1 to 3 show steps in making a sealed passage in a part of refractory composite material in application of a method of the invention.

In FIG. 1, reference 10 designates a part made of refractory composite material. A hole 12 is machined in the part where a sealed passage is to be made in the part 10.

Figure 2:
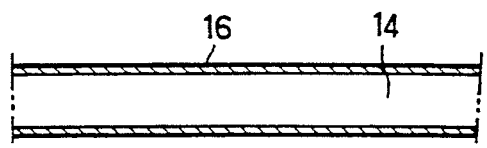

A metal tubular lining 14 coated on its outside surface with a uniform layer of brazing material 16 is inserted into the hole 12 (FIG. 2).

Figure 3:
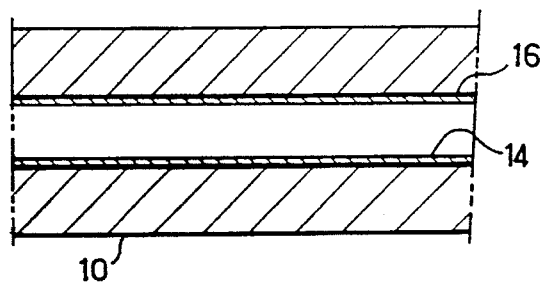

The assembly is then raised to the temperature required for brazing, and it is maintained at that temperature for an appropriate length of time to ensure firstly that the brazing material melts and reacts with the composite material and with the metal lining, and secondly to ensure that the metal lining is brought into intimate contact with the wall of the hole by differential expansion (FIG. 3). During brazing, it is possible to put the metal lining under internal pressure.

The metal lining is made of a metal or a metal alloy that conducts heat, such as copper, molybdenum, etc.

The diameter of the metal lining and its thickness are selected, in particular, to ensure:

that the metal lining fitted with its layer of brazing material can be inserted into the hole with a small amount of clearance;

that the metal lining remains intact after brazing; and that contact between the refractory composite material and the brazed metal lining is permanent, the differential expansion that takes place while the part is in use being compensated by plastic deformation of the metal lining.

Thus, the thickness of the metal lining must be greater than a minimum value below which it runs the risk of ceasing to remain intact due to attack from the brazing material or from the pressure of the fluid in the passage. As the diameter of the metal lining increases, so the minimum value of its thickness increases. In addition, the thickness of the metal lining must remain smaller than a maximum value above which it ceases to be sufficiently plastic. For a given metal composition, the minimum and maximum values for the thickness of the metal lining can be determined by experiment.

A sealed passage has been made in a part made of C/C composite material under the following conditions.

The composite material part was made by densifying fiber reinforcement made up of layers of needled carbon cloth, as described in French patent application number 2 584 106. Initially, densification was performed by chemical vapor infiltration so as to form a deposit of pyrolytic carbon on the fibers of the reinforcement, and that was followed by impregnation by means of a slip, followed by pyrolysis. The resulting material was subjected to high temperature heat treatment (graphitization).

A rectilinear hole of 11.6 mm diameter was machined through the part over the total length thereof (200 mm).

The metal lining was constituted by a tube of soft copper having an outside diameter 11.3 mm and an inside diameter of 10 mm (thickness 0.65 mm).

A layer of brazing material having a thickness of 0.1 mm was deposited on the copper tube. The brazing material used is sold under the name "Ticusil" by the American company GTE WESGO, said brazing material being based on an alloy of Ti+Cu+Si++Ag.

After the copper tube coated in brazing material had been inserted in the hole, the assembly constituted by the part of composite material and the copper tube was raised to a temperature of 890° C. and that temperature was maintained for 5 minutes. As it expanded, the metal lining made of copper pressed against the wall of the hole and took up the shape thereof.

After cooling, it was observed that the hole was fully lined by the copper in intimate contact with the refractory composite material, thus achieving a perfectly sealed passage. It was observed that the metal lining had remained completely intact. Various tests have shown that for a tube of soft copper having the same outside diameter as above (11.3 mm), the wall thickness of the tube must be at least 0.5 mm thick since otherwise it is very probable that local breaks will occur in the metal lining, and must be no more than 1 mm thick since otherwise it will not be sufficiently plastic and that will give rise to local defects in its bonding with the wall of the hole.

A thermal protection element having a length of 200 mm, and a sealed passage having a diameter of 10 mm, and made in the manner described above was tested using an electron gun under conditions of high heat flow. After 300 cycles during which the element had been subjected to steady heat flows of 11 MW/m2 and to pulse flows of 34 MW/m2, the element was found still to be performing its function.

Figure 8:
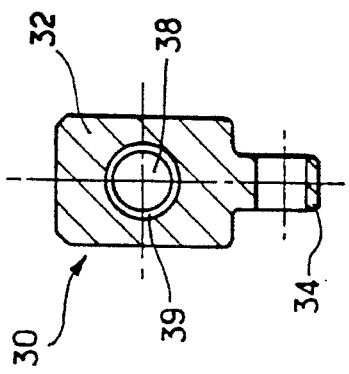
FIG. 8 is a sectional view showing an element having a curved passage.

Naturally, a plurality of sealed passages could be formed in the same manner in the same part. In addition, it is possible to implement sealed passages that are curved, and not rectilinear (FIG. 8).

To form a sealed passage, it is proposed above to begin by machining a hole in the part of composite material. However, it is also possible to leave an empty hole during manufacture of the part. It is also possible to make the part out of two portions, each of which has a groove, with a hole being formed by putting the two portions together.

The method of forming sealed passages makes it possible to implement structures of refractory composite material that are cooled by the flow of a fluid. Such structures can be used, in particular for the walls of the combustion chamber of combined engines, or for portions of the aerodynamic structures of hypersonic spaceplanes, in particular at the front end (nose), along the leading edges of the wings, and around the air intake fairing.

Another application is making thermal protection structures for very high temperature environments, an electromagnetic confinement chamber for a plasma in a toroidal enclosure designed for controlled thermonuclear fusion.

Figure 4:
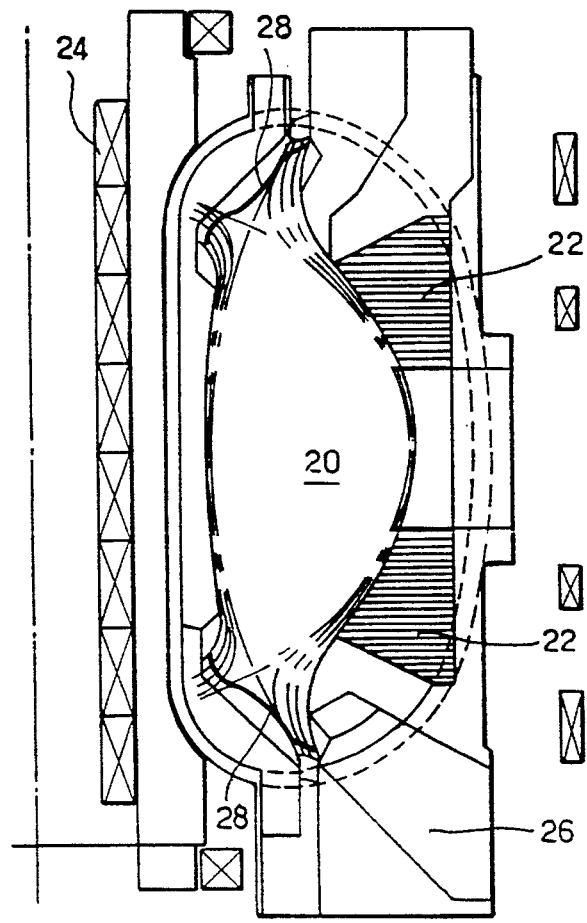
FIG. 4 is a highly diagrammatic section view showing a fragment of an installation for controlled thermonuclear fusion.

FIG. 4 is a highly diagrammatic section through such an enclosure.

The confinement chamber 20 is surrounded by induction coils 22 and 24 and it is connected to a vacuum source by a duct 26.

The inside wall of the chamber 20 is coated with thermal protection. At top and bottom portions of the chamber, each deflector-forming inside wall portion 28 is a zone subjected to particularly high stresses. As shown in FIG. 4, the electromagnetic field lines cross in this region. Confinement is less intense, such that the deflector is subjected to very high heat flows. Thermal protection on each deflector has the function of protecting the wall of the chamber. The surface temperature of the thermal protection must nevertheless not exceed about 1000° C. to 1200° C. in order to avoid the plasma being polluted by the protection material subliming. That is why such thermal protection is advantageously constituted by a structure made of refractory composite material that is cooled by a flow of fluid.

Figure 5:
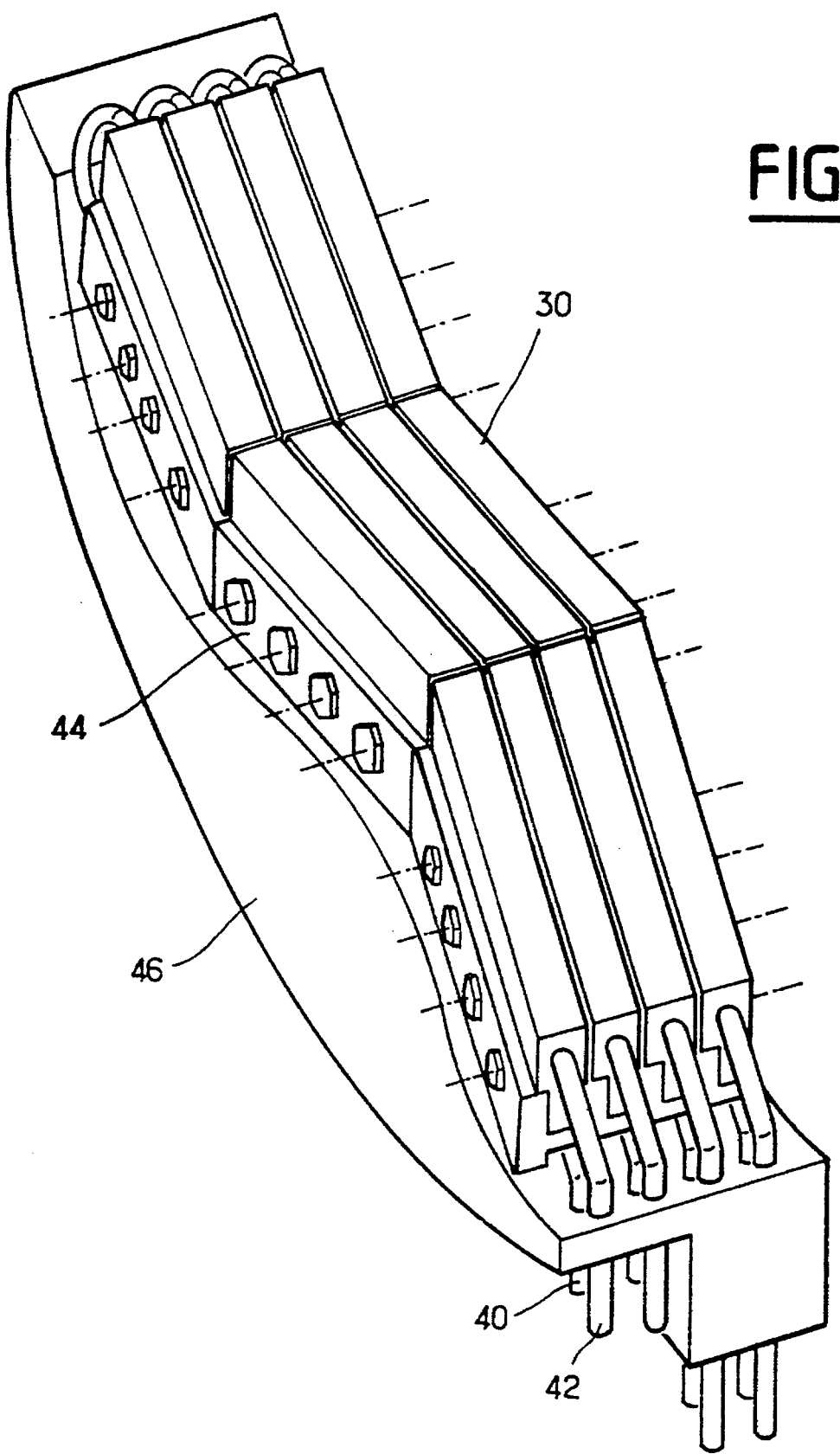
FIG. 5 shows a thermal protection structure constituting a portion of the wall of the enclosure in FIG. 4.

FIG. 5 is a fragmentary view on a larger scale of the thermal protection for one of the deflectors 28. It is made up of identical unitary elements 30 each having a passage formed therein for the flow of a cooling fluid. These passages are connected to pipework 40, 42 for feeding and delivering the cooling fluid, which fluid may be water at 150° C. and at a pressure of 30 bars to 50 bars, for example.

In the example shown, the elements 30 are disposed in a plurality of zigzag lines that fit closely to the profile of the wall of the chamber. The cooling fluid is fed to one end of each line and is removed from its opposite end. The elements 30 are mounted on a metal supporting structure 44 which is secured to the wall 46 of the chamber.

Figure 6:
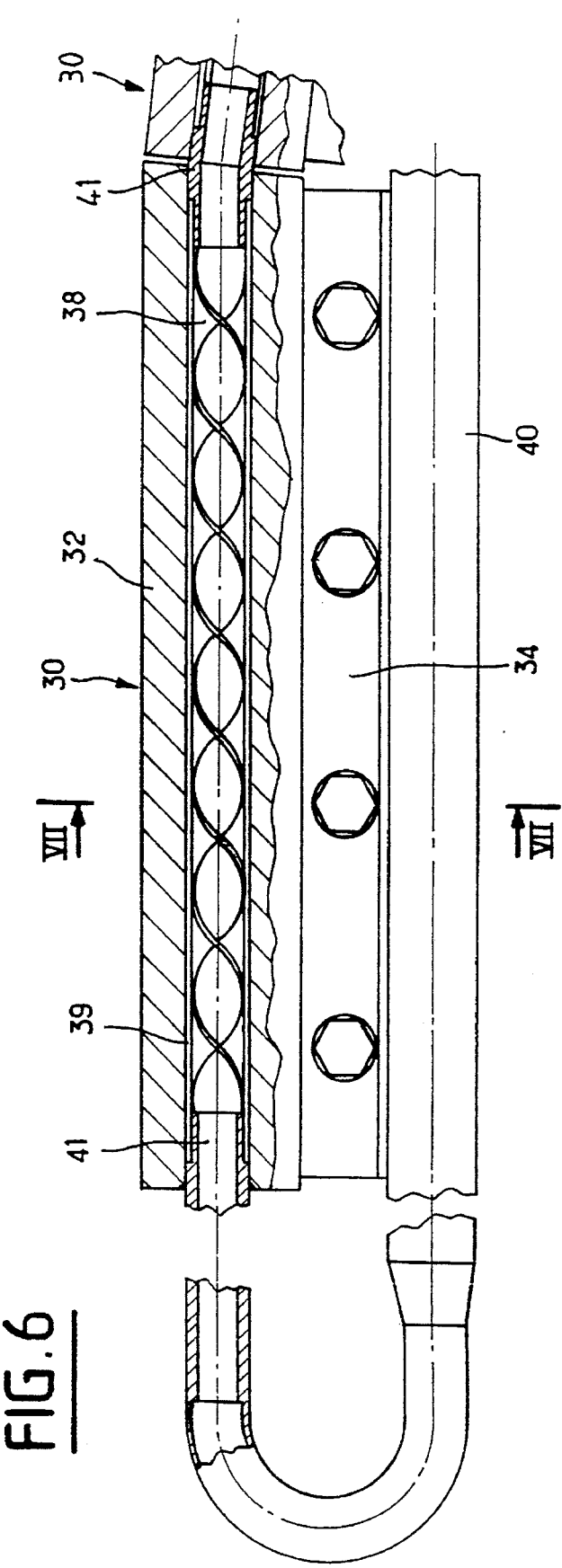
FIG. 6 is an elevation view, partially in section, showing an element of the FIG. 5 thermal protection structure.
Figure 7:
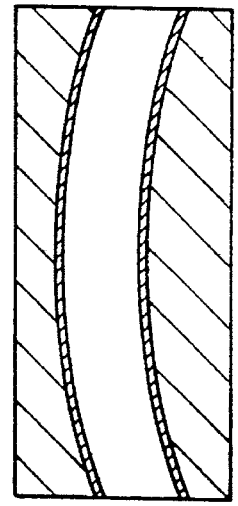
FIG. 7 is a fragmentary section view on plane VII—VII of FIG. 6.

An element 30 is shown in FIGS. 6 and 7. It comprises a section bar 32 of refractory composite material, e.g. of the C/C type. At its base, the bar 32 has a fixing rib 34 pierced by holes 36 to enable the bar to be mounted by nut and bolt systems to the support structure. A longitudinal sealed passage 38 is formed in the bar 32 as described above with reference to FIGS. 1 to 3, sealing being provided by brazing a metal lining 39 made of copper. The passage 38 is connected to a pipe 40 or 42 or to a sealed passage in an adjacent element by couplings 41 welded to the ends of the metal lining 38.

The couplings 41 are made of copper, i.e. the same material as the lining 39, and they are connected thereto at the ends of the passage 38 by electron bombardment welding. The pipework 40, 42 is made up of stainless steel tubes that are friction welded to the copper couplings 41.

We claim:

1. A structure comprising a plurality of elements made of a thermostructural refractory composite material comprising a fibrous reinforcement made of fibers in a refractory material and densified by a matrix in a refractory material, each of said elements having an internal passage whose wall is sealed by a metal lining bonded to the refractory composite material to allow a fluid to flow along the passage, the metal lining being plastically deformable under conditions of use of the structure such that differential expansion of thermal origin between the refractory composite material and the metal lining can be compensated by plastic deformation of the lining, whereas mechanical strength of the structure is provided by the thermostructural refractory composite material; and said plurality of elements being disposed in at least one line with the passages of two adjacent elements being connected one to the other by a coupling bonded to the metal linings of said passages to allow a fluid to flow along the passages of said elements aligned along said line.

2. A structure as claimed in claim 1, wherein each element of said plurality of elements is in the form of a bar of refractory composite material provided with a longitudinal passage.

3. A structure as claimed in claim 2, wherein said bar is rectilinear.

4. A structured as claimed in claim 2, wherein said passage is curved.

5. A thermal protection structure for a wall in an electromagnetic plasma confinement chamber of an installation for controlled thermonuclear fusion, said structure comprising a plurality of elements of thermostructural refractory composite material each having an internal passage whose wall is sealed by a metal lining bonded to the refractory composite material, with the passages of the elements being connected together and to pipework for feeding and removing a cooling fluid by means of couplings bonded to said metal linings, to allow a cooling fluid to flow along said passages for cooling the thermal protection structure, the metal lining of each element being plastically deformable under the conditions of use of the thermal protection structure such that differential expansion of thermal origin between the refractory composite material and the metal lining can be compensated by plastic deformation of the lining whereas mechanical strength of the thermal protection structure is provided by the thermostructural refractory composite material.

6. A thermal protection structure as claimed in claim 5, wherein said element comprise a plurality of identical unit elements disposed in at least one line that follow the profile of said wall of the plasma confinement chamber.

7. A thermal protection structure as claimed in claim 6, wherein each unit element comprises a section bar provided with a longitudinal passage.

8. A thermal protection structure as claim in claim 7, wherein the section bar is rectilinear.

9. A thermal protection structure as claimed in claim 6, wherein the section bar is formed with a fixing rib for connecting the element to a support structure.

10. A thermal protection structure as claimed in claim 5, wherein said metal linings are made of soft copper.

11. A thermal protection structure as claimed in claim 10, wherein said passages are connected together and to the pipework for feeding and removing a cooling fluid by means of tubular copper couplings welded to the linings and to the pipework.

12. A thermal protection structure as claimed in claim 5, wherein said thermostructural refractory composite material is a carbon-carbon composite material.

* * * * *

UNITED STATES PATENT AND TRADEMARK OFFICE
CERTIFICATE OF CORRECTION

PATENT NO. : 5,604,776
DATED : February 18, 1997
INVENTOR(S) : Ludovic Filipuzzi, et al.

It is certified that error appears in the above-indentified patent and that said Letters Patent is hereby corrected as shown below:

On the title page, item [57],
Abstract, line 17, "intel" should read
--internal--.

Signed and Sealed this

Twenty-ninth Day of September, 1998

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,604,776
DATED : February 18, 1997
INVENTOR(S) : Filipuzzi, et al.

It is certified that error appears in the above-identified patent and that said Letters Patent is hereby corrected as shown below:

Column 4, line 8, "Ti + Cu + Si ++ Ag" should read
--Ti + Cu + Si + Ag--.

Signed and Sealed this

Nineteenth Day of October, 1999

Attest:

Q. TODD DICKINSON

*Attesting Officer*  *Acting Commissioner of Patents and Trademarks*